(12) United States Patent
Lee et al.

(10) Patent No.: US 9,803,110 B2
(45) Date of Patent: Oct. 31, 2017

(54) METHOD OF MAKING AN ARTICLE USING FLUORINATED FLUID

(71) Applicant: 3M INNOVATIVE PROPERTIES COMPANY, St. Paul, MN (US)

(72) Inventors: Nicholas A. Lee, Woodbury, MN (US); Nicolas P. LaBelle, Rosemount, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 15/366,777

(22) Filed: Dec. 1, 2016

(65) Prior Publication Data

US 2017/0158915 A1    Jun. 8, 2017

Related U.S. Application Data

(60) Provisional application No. 62/262,103, filed on Dec. 2, 2015.

(51) Int. Cl.
| | |
|---|---|
| *C09J 5/02* | (2006.01) |
| *B05D 5/08* | (2006.01) |
| *B05D 1/42* | (2006.01) |
| *B05D 1/02* | (2006.01) |
| *B29C 65/48* | (2006.01) |
| *C09J 7/02* | (2006.01) |
| *C09J 133/08* | (2006.01) |
| *B29L 31/34* | (2006.01) |

(Continued)

(52) U.S. Cl.
CPC .... *C09J 5/02* (2013.01); *B05D 1/02* (2013.01); *B05D 1/42* (2013.01); *B05D 5/08* (2013.01); *B29C 65/4805* (2013.01); *C09J 7/0217* (2013.01); *C09J 133/08* (2013.01); *B29L 2007/00* (2013.01); *B29L 2031/3076* (2013.01); *B29L 2031/34* (2013.01); *C09J 2205/306* (2013.01)

(58) Field of Classification Search
CPC ........................................................ C09J 5/02
See application file for complete search history.

(56) References Cited

U.S. PATENT DOCUMENTS

| | | |
|---|---|---|
| RE24,906 E | 12/1960 | Ulrich |
| 4,028,475 A | 6/1977 | Willdorf |
| RE29,663 E | 6/1978 | Theissen |

(Continued)

OTHER PUBLICATIONS

Pocius, Adhesion and Adhesives Technology: An Introduction (1997) pp. 216-223.

(Continued)

*Primary Examiner* — Daniel Lee

(57) ABSTRACT

The method includes applying a fluorinated fluid to at least one of a surface of an object or an adhesive surface on an adhesive article, positioning the adhesive surface to face the surface of the object such that the fluorinated fluid is between the surface of the object and the adhesive surface; and removing at least some of the fluorinated fluid to permit bonding between the surface of the object and the adhesive surface. The fluorinated fluid generally facilitates the repositioning of the adhesive surface on the surface of the object before removing the fluorinated fluid. A kit comprising an adhesive article and a container including a fluorinated fluid is also described.

17 Claims, 2 Drawing Sheets

(51) Int. Cl.
  *B29L 31/30* (2006.01)
  *B29L 7/00* (2006.01)

(56) References Cited

U.S. PATENT DOCUMENTS

| | | | |
|---|---|---|---|
| 4,226,910 A | 10/1980 | Dahlen | |
| 4,288,493 A | 9/1981 | Kropp | |
| 6,380,149 B2 * | 4/2002 | Flynn | C07C 43/12 |
| | | | 134/40 |
| 2002/0117257 A1 * | 8/2002 | Kubik | C09J 5/02 |
| | | | 156/305 |
| 2014/0371122 A1 | 12/2014 | Ikegaya | |

OTHER PUBLICATIONS

Satas, Handbook of Pressure Sensitive Adhesive Technology (1989), pp. 171-176.
Satas, Handbook of Pressure Sensitive Adhesive Technology (1989), pp. 396-443.
Scotchgard™ Invisible Transit Film 1004 Application & Removal Instructions, 3M Technical Bulletin, Sep. 2008, pp. 1-7.

\* cited by examiner ed out for a variety of purposes. One method of applying the PSA-coated polymer film to a substrate is best described as a "wet" application technique. In a wet application, the pressure sensitive adhesive layer of the film and/or the substrate is first wet with an application solution. The application solution is typically sprayed onto the surface of the substrate and pressure sensitive adhesive in a fine mist so that relatively uniform coverage of the pressure sensitive adhesive and/or substrate is obtained. The pressure sensitive adhesive layer is then brought into contact with the surface of the substrate such that a layer of application solution is present at the interface between the pressure sensitive adhesive and the substrate. The layer of application solution interrupts the adhesive bonding of the pressure sensitive adhesive layer to the substrate thereby allowing the PSA-coated film to be precisely positioned on the substrate. After the film has been positioned, the bulk of the application solution is then removed from between the pressure sensitive adhesive and the substrate by applying pressure to the polymer film, for example, using a squeegee which forces the application solution to an outer edge of the film. Once the application solution is removed, an adhesive bond is formed between the pressure sensitive adhesive and the substrate. The strength of the adhesive bond may increase over time as the remaining application solution evaporates.

METHOD OF MAKING AN ARTICLE USING FLUORINATED FLUID

CROSS REFERENCE TO RELATED APPLICATION

This application claims priority to U.S. Provisional Application No. 62/262,103, filed Dec. 2, 2015, the disclosure of which is incorporated by reference in its entirety herein.

BACKGROUND

Adhesively bonding pressure sensitive adhesive (PSA)-coated polymer films onto substrates has been carried out for a variety of purposes. One method of applying the PSA-coated polymer film to a substrate is best described as a "wet" application technique. In a wet application, the pressure sensitive adhesive layer of the film and/or the substrate is first wet with an application solution. The application solution is typically sprayed onto the surface of the substrate and pressure sensitive adhesive in a fine mist so that relatively uniform coverage of the pressure sensitive adhesive and/or substrate is obtained. The pressure sensitive adhesive layer is then brought into contact with the surface of the substrate such that a layer of application solution is present at the interface between the pressure sensitive adhesive and the substrate. The layer of application solution interrupts the adhesive bonding of the pressure sensitive adhesive layer to the substrate thereby allowing the PSA-coated film to be precisely positioned on the substrate. After the film has been positioned, the bulk of the application solution is then removed from between the pressure sensitive adhesive and the substrate by applying pressure to the polymer film, for example, using a squeegee which forces the application solution to an outer edge of the film. Once the application solution is removed, an adhesive bond is formed between the pressure sensitive adhesive and the substrate. The strength of the adhesive bond may increase over time as the remaining application solution evaporates.

Application solutions typically used in a wet application technique typically comprise a dilute (i.e., about 0.01% to about 1%-wt.) water-based solution of a wetting agent or surfactant, very commonly a household detergent or soap. The wetting agent functions to reduce the surface tension of the water thereby allowing the application solution to wet-out the surface of the substrate in a relatively continuous coating. An application solution including water, a wetting agent, and sodium chloride was reported in U.S. Pat. Appl. Pub. No. 2002/0117257 (Kubik).

SUMMARY

Some applications for which applying a PSA film to a substrate using an application solution would be useful do not permit the use of water or other chemically or electrically reactive fluids. The water, surfactants, and sodium chloride described in the art as useful in application solutions can cause corrosion of certain substrates. We have found that fluorinated fluids can be used as application solutions in applications that do not permit the use of water. The fluorinated fluid does not react with the substrate or the adhesive. Surprisingly, the presence of fluorinated fluids does not destroy the adhesive properties of the pressure-sensitive adhesive.

In one aspect, the present disclosure provides a method of making an article. The method includes applying a fluorinated fluid to at least one of a surface of an object or an adhesive surface on an adhesive article, positioning the adhesive surface to face the surface of the object such that the fluorinated fluid is between the surface of the object and the adhesive surface; and removing at least some of the fluorinated fluid to permit bonding between the surface of the object and the adhesive surface. The fluorinated fluid generally facilitates the repositioning of the adhesive surface on the surface of the object before removing the fluorinated fluid.

In some embodiments, the adhesive article is a bonding film or an adhesive transfer tape. In some embodiments, the method further includes applying a second fluorinated fluid to at least one of a surface of a second object or a second adhesive surface on the adhesive article, positioning the second adhesive surface to face the surface of the second object such that the second fluorinated fluid is between the surface of the second object and the second adhesive surface of the article, and removing at least some of the second fluorinated fluid to permit bonding between the surface of the second object and the second adhesive surface.

In another aspect, the present disclosure provides an adhesive article-application kit. The kit includes an adhesive article and a container including a fluorinated fluid.

In this application, terms such as "a", "an" and "the" are not intended to refer to only a singular entity, but include the general class of which a specific example may be used for illustration. The terms "a", "an", and "the" are used interchangeably with the term "at least one". The phrases "at least one of" and "comprises at least one of" followed by a list refers to any one of the items in the list and any combination of two or more items in the list. All numerical ranges are inclusive of their endpoints and non-integral values between the endpoints unless otherwise stated (e.g., 1 to 5 includes 1, 1.5, 2, 2.75, 3, 3.80, 4, 5, etc.).

The above summary of the present disclosure is not intended to describe each disclosed embodiment or every implementation of the present disclosure. The description that follows more particularly exemplifies illustrative embodiments. It is to be understood, therefore, that the following description should not be read in a manner that would unduly limit the scope of this disclosure.

BRIEF DESCRIPTION OF THE DRAWINGS

The disclosure may be more completely understood in consideration of the following detailed description of various embodiments of the disclosure in connection with the accompanying drawings, in which.

DETAILED DESCRIPTION

Figure 1:
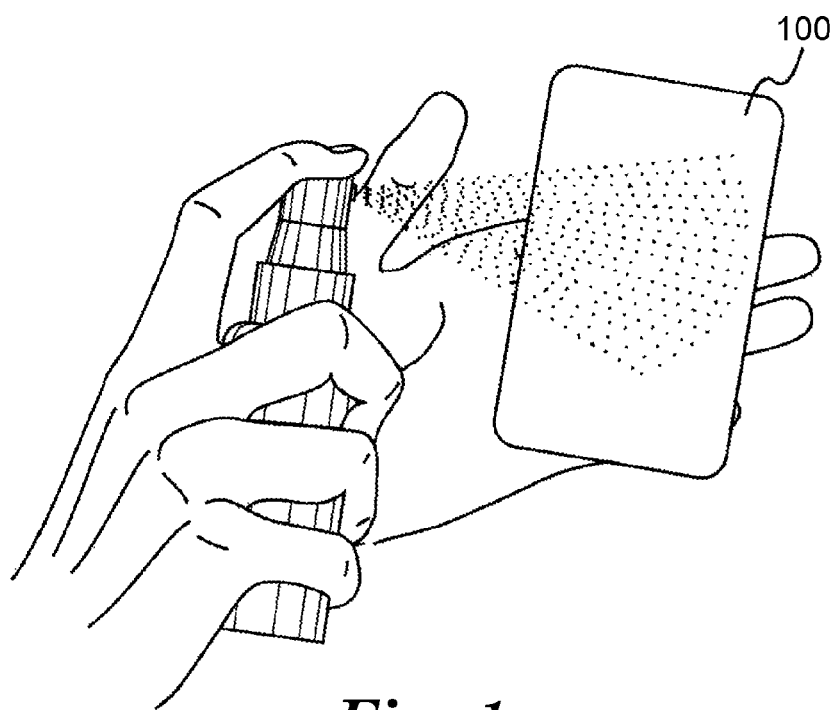
FIG. 1 shows application of a fluorinated fluid to an adhesive surface of an adhesive article according to some embodiments of the method of the present disclosure.

A variety of fluorinated fluids are useful for the method and kit according to the present disclosure. The first (and in some embodiments second) fluorinated fluid may be partially fluorinated or fully fluorinated. Fully fluorinated fluids (also called perfluorinated fluids) can include linear, branched, and/or cyclic alkyl groups in which all C—H bonds are replaced by C—F bonds. Partially fluorinated fluids can include linear, branched, and/or cyclic alkyl groups containing C—F bonds and hydrogen or chlorine atoms in place of some fluorine atoms. The first and second fluorinated fluid can also contain one or more functional groups including ether groups, amine groups, ketones, and carbon-carbon double bonds. Mixtures of two or more different fluorinated fluids may be useful. In some embodiments, the first and/or second fluorinated fluid comprises at least one of a hydrofluoroether, a hydrofluorocarbon, a hydrochlorofluorocarbon, a perfluorocarbon, a perfluoroketone, or a perfluoroolefin. In some embodiments, the first and/or second fluorinated fluid comprises at least one of a hydrofluoroether, a perfluoroketone, or a perfluoroolefin.

Examples of useful fluorinated fluids include cyclo-$C_6F_{11}CF_2OC_2H_5$, cyclo-$C_6F_{11}CF_2OCH_3$, 4-$CF_3$-cyclo-$C_6F_{10}CF_2OCH_3$, $C_4F_9OCH_3$, cyclo-$C_6F_{11}OCH_3$, $(CF_3)_2CFCF_2OCH_3$, $(CF_3)_2CFCF_2OC_2H_5$, $C_8F_{17}OCH_3$, $C_2F_5CF(OCH_3)CF(CF_3)_2$, $CF_3CF(OCH_3)CF(CF_3)_2$, $C_5F_{11}OCH_3$, $C_5F_{11}OC_2H_5$, $C_3F_7OCH_3$, $C_8F_{17}$—O—$C_2F_4H$, $C_7F_{15}$—O—$C_2F_4H$, $C_6F_{13}$—O—$C_2F_4$—O—$CF_2H$, $C_4F_9$—O—$C_2F_4H$, $HCF_2CF_2$—O—$CF_2CF_2$—O—$CF_2CF_2H$, $C_4F_9$—O—$(CF_2)_5H$, $C_5F_{11}$—O—$(CF_2)_5H$, $C_8F_{17}$—O—$(CF_2)_5H$, $C_4F_9$—O—$CF_2C(CF_3)_2CF_2H$, $H(CF_2)_4$—O—$(CF_2)_4H$, $Cl(CF_2)_4$—O—$(CF_2)_4H$, $C_6F_{13}$—O—$C_2F_4H$, $C_4F_9$—O—$(CF_2)_4$—O—$(CF_2)_3H$, $(C_2F_5)_2CFCF_2$—O—$C_2F_4H$, cyclo-$C_6F_{11}CF_2$—O—$C_2F_4H$, $C_4F_9$—O—$C_2F_4$—O—$C_3F_6H$, $C_6F_{13}$—O—$C_4F_8H$, $C_6F_{13}$—O—$C_3F_6H$, $C_5F_{11}$—O—$(CF_2)_4$—H, $C_4F_9$—O—$C_3F_6H$, $C_8F_{17}OCF_2OC_3F_6H$, $HC_3F_6OC_3F_6H$, $C_4F_9OC_2H_5$, $C_2F_5CF(OCH_3)CF(CF_3)_2$, $C_2F_5CF(OCH_3)C_3F_7$, $(CF_3)_2C(OCH_3)C_3F_7$, $C_2F_5CCF_3(OCH_3)C_2F_5$, $C_3F_7OCH_3$, $CF_3CF(CF_3)OCH_3$, $C_3HF_6CH(CH_3)OC_3HF_6$, $C_2HF_4CH(CH_3)OC_4HF_8$, $C_3HF_6CH(CH_3)C_2F_4OCHF_2$, $C_2HF_4CH(CH_3)OCF_2C(CF_3)CHF_2$, $CF_3CH_2OCF_2CHF_2$, and other hydrofluoroethers; $CH_2FCF_2CFH_2$, $CHF_2(CF_2)_2CF_2H$, $CF_3CH_2CF_2CH_2CF_3$, $CF_3(CFH)_2CF_2CF_3$, $CF_3(CF_2)_4CF_2H$, $CF_3(CF_2)_5CH_2CH_3$, $CH_3CF_2CH_2CF_3$, and other hydrofluorocarbons (HFCs); $CF_3CF_2CHCl_2$, $CClF_2CF_2CHClF$, $CCl_2FCH_3$, and other hydrochlorofluorocarbons (HCFCs); $C_5F_{12}$, $C_6F_{14}$, $C_7F_{16}$, $C_8F_{18}$, and other perfluorocarbons (PFCs); $CF_3N(C_2F_4)_2O$, $C_2F_5$—$N(C_2F_4)_2O$, $C_3F_7$—$N(C_2F_4)_2O$, $(C_3F_7)_3N$, and other perfluoroethers or perfluoroamines; $CF_3COCF_2COCF_3$, $C_2F_5COC_3F_7$, $(CF_3)_2CFCOCF(CF_3)_2$, $(CF_3)_2CFCOCH(CF_3)_2$, and other perfluoroketones (PFKs); and $CF_3CH=CHC_2F_5$, $CF_3CF=CH_2$, $C_2F_5CF=CFCF(OCH_3)CF_2CF_3$, $CF_3CF=CFCF(OCH_3)CF_3$, $CHF_2CF=CH_2$, $CH_3CF=CF_2$, $CH_2FCF=CF_2$, $CH_2FCH=CF_2$, $CHF_2CH=CHF$, $CF_3CF=CFCF_3$, $C_2F_5CF=CFCF(OCH_3)CF_2CF_3$, $CF_2(OCH_3)CF=CF$—$CH_2CF_3$, and other hydrofluoroolefins (HFOs). Certain HFO's and other fluorinated fluids are available commercially, for example, from The Chemours Company, Wilmington, Del., under the trade designation "VERTREL" Specialty Fluids.

In some embodiments in which the fluorinated fluid is a hydrofluoroether, the hydrofluoroether is mono-, di-, or trialkoxy-substituted perfluoroalkane, perfluorocycloalkane, perfluorocycloalkyl-containing perfluoroalkane, or perfluorocycloalkylene-containing perfluoroalkane compound, said compound optionally containing one or more additional catenary heteroatoms. Such hydrofluoroethers can be represented by formula $Rf^3[O—R_h]_f$, wherein f is an integer from 1 to 3; $Rf^3$ is a perfluoroalkyl or di- or trivalent perfluoroalkylene, each of which may be interrupted with at least one —O—, —S—, or —NH—; and $R_h$ is an alkyl group optionally interrupted with at least one —O—, —S—, or —NH—. In some embodiments, when f is 1, $Rf^3$ is selected from the group consisting of linear or branched perfluoroalkyl groups having from 2 to about 15 carbon atoms, perfluorocycloalkyl-containing perfluoroalkyl groups having from 5 to about 15 carbon atoms, and perfluorocycloalkyl groups having from 3 to about 12 carbon atoms. In some embodiments, when x is 2, $Rf^3$ is selected from the group consisting of linear or branched perfluoroalkanediyl groups or perfluoroalkylidene groups having from 2 to about 15 carbon atoms, perfluorocycloalkyl- or perfluorocycloalkylene-containing perfluoroalkanediyl or perfluoroalkylidene groups having from 6 to about 15 carbon atoms, and perfluorocycloalkanediyl groups or perfluorocycloalkylidene groups having from 3 to about 12 carbon atoms. In some embodiments, when x is 3, $Rf^3$ is selected from the group consisting of linear or branched perfluoroalkanetriyl groups having from 2 to about 15 carbon atoms, perfluorocycloalkyl- or perfluorocycloalkylene-containing perfluoroalkanetriyl groups having from 6 to about 15 carbon atoms, and perfluorocycloalkanetriyl groups having from 3 to about 12 carbon atoms. In some embodiments of formula $Rf^3[O—R_h]_f$, each $R_h$ is independently selected from the group consisting of linear or branched alkyl groups having from 1 to about 8 carbon atoms, cycloalkyl-containing alkyl groups having from 4 to about 8 carbon atoms, and cycloalkyl groups having from 3 to about 8 carbon atoms. In some embodiments, the sum of the number of carbon atoms in $Rf^3$ and the number of carbon atoms in $R_h$ is greater than or equal to 4. The perfluorocycloalkyl and perfluorocycloalkylene groups contained within the perfluoroalkyl, perfluoroalkanediyl, perfluoroalkylidene and perfluoroalkanetriyl groups can optionally (and independently) be substituted with, e.g., one or more perfluoroalkyl groups having from 1 to about 4 carbon atoms. Examples of useful hydrofluoroethers include those described above and those obtained from 3M Company, St. Paul, Minn., under the trade designation "NOVEC" Engineered Fluids.

The fluorinated fluid may be selected, for example, by its boiling point and the application for which it is being used. It is useful for the fluorinated fluid to have a boiling point such that does not evaporate when it is applied to the surface of the object before the adhesive article can be repositioned, if desired. Different applications can require different temperatures on the surface of the object when the adhesive article is applied.

In some embodiments of the method and kit according to the present disclosure, the adhesive surface on the adhesive article comprises a PSA. PSAs are well known to those of ordinary skill in the art to possess properties including the following: (1) aggressive and permanent tack, (2) adherence with no more than finger pressure, (3) sufficient ability to hold onto an adherend, and (4) sufficient cohesive strength to be cleanly removable from the adherend. Materials that have been found to function well as PSAs are polymers designed and formulated to exhibit the requisite viscoelastic properties resulting in a desired balance of tack, peel adhesion, and shear holding power.

One method useful for identifying pressure sensitive adhesives is the Dahlquist criterion. This criterion defines a pressure sensitive adhesive as an adhesive having a 1 second creep compliance of greater than $1 \times 10^{-6}$ cm$^2$/dyne as described in *Handbook of Pressure Sensitive Adhesive Technology*, Donatas Satas (Ed.), 2nd Edition, p. 172, Van Nostrand Reinhold, New York, N.Y., 1989. Alternatively, since modulus is, to a first approximation, the inverse of creep compliance, pressure sensitive adhesives may be defined as adhesives having a storage modulus of less than about $1 \times 10^6$ dynes/cm$^2$.

A variety of PSAs may be useful on the adhesive surface (and optionally second adhesive surface) of the adhesive article. Examples of suitable PSAs include natural rubber-, acrylic-, block copolymer-, silicone-, polyisobutylene-, polyvinyl ether-, polybutadiene-, or and urea-based pressure sensitive adhesive and combinations thereof. These PSAs can be prepared, for example, as described in *Adhesion and Adhesives Technology*, Alphonsus V. Pocius, Hanser/Gardner Publications, Inc., Cincinnati, Ohio, 1997, pages 216 to 223, *Handbook of Pressure Sensitive Adhesive Technology*, Donatas Satas (Ed.), 2nd Edition, Van Nostrand Reinhold, New York, N.Y., 1989, Chapter 15, and U.S. Pat. No. Re 24,906 (Ulrich).

Useful adhesive articles typically comprise a polymeric film or paper backing onto which an adhesive (in some embodiments, pressure sensitive adhesive) is disposed. Polymeric materials suitable as a film for an adhesive article include polyesters; polycarbonates; polyolefins (e.g., polyethylene); ethyl cellulose film; cellulose esters (e.g., cellulose acetate, cellulose acetate butyrate, and cellulose propionate); polyvinylidene chloride-vinyl chloride and/or acrylonitrile polymers such as saran; vinyl chloride polymers (e.g., copolymers of vinyl chloride and vinyl acetate); polyfluoroethylenes (e.g., polytetrafluoroethylene and polytrifluorochloroethylene); polyvinyl alcohol; polyamides such as nylon; polystyrenes such as the copolymers of styrene and isobutylene; regenerated cellulose; benzyl cellulose; cellulose nitrate; gelatin; glycol cellulose; acrylate and methacrylates; urea aldehyde films; polyvinyl acetal; and polyvinyl butyral. In some embodiments, the adhesive article comprises a film comprising at least one of polyester, polycarbonate, polyolefin, or acrylic onto which an adhesive is disposed to provide the adhesive surface. One or more layers of any of these materials may be useful to form a film. Optionally, the film may include deposited metal layers such as aluminum, silver, and nickel.

In some embodiments of the method according to the present disclosure, the method further comprises removing a release liner from the adhesive surface before positioning the adhesive surface to face the surface of the object such that the fluorinated fluid is between the surface of the object and the adhesive surface. Similarly, in the kit according to the present disclosure, the adhesive article can have one or more release liners. A release liner can be a paper liner or polymer film made, for example, from any of the polymers described above for the adhesive article. The release liner includes a release surface which can be a release coating (e.g., a silicone, fluorochemical, or carbamate coating) on the paper backing or polymeric film. A release liner is useful for protecting an adhesive surface before it is applied to the surface of the object. In embodiments in which a second adhesive surface is applied to a second object, the adhesive article may have two release liners.

The surface of the object to which the adhesive article is applied may be any desired material. In some embodiments, the surface of the object comprises at least one of metal (e.g., stainless steel or aluminum), glass (e.g., which may be coated with indium tin oxide), a polymer (e.g., a plastic, rubber, thermoplastic elastomer, or thermoset), or a composite. A composite material may be made from any two or more constituent materials with different physical or chemical properties. When the constituents are combined to make a composite, a material having characteristics different from the individual components is typically achieved. Some examples of useful composites include fiber-reinforced polymers (e.g., carbon fiber reinforced epoxies and glass-reinforced plastic); metal matrix compositions, and ceramic matrix composites. The surface of the object to which the adhesive article is applied may include polymers such as polyolefins (polypropylene, polyethylene, high density polyethylene, blends of polypropylene), polyamide 6 (PA6), acrylonitrile butadiene styrene (ABS), polycarbonate (PC), PC/ABS blends, polyvinyl chloride (PVC), polyamide (PA), polyurethane (PUR), thermoplastic elastomers (TPE), polyoxymethylene (POM), polystyrene, poly(methyl) methacrylate (PMMA), and combinations thereof. The surface of the object may also include a metal coating on such polymers. In some embodiments, the object to which the adhesive article is applied comprises a transparent material such as glass or a polymer (e.g., acrylic, or polycarbonate).

When used in accordance with the method of the present disclosure, the fluorinated fluid is applied to the adhesive surface on the adhesive article, the surface of the object to which the adhesive article is to be applied, or both. In some embodiments, the fluorinated fluid is applied using a pressurized or pump-style spray bottle that applies the application solution in the form of a fine spray or mist. The fluorinated fluid could also be brushed on at least one of the surface of the object or the adhesive article. At least one of the object or the adhesive article could also be dipped in the fluorinated fluid. The adhesive surface is then brought into contact with the surface of the object such that the fluorinated fluid is present between the adhesive surface and the surface of the object. The next step is to remove at least a portion of the fluorinated fluid to permit bonding between the surface of the object and the adhesive surface. This may be carried out by applying pressure to at least a portion of the adhesive article to cause at least some of the fluorinated fluid to flow out from between the adhesive surface and the surface of the object. The adhesive (e.g., pressure sensitive adhesive) can then bond to the surface of the object. Pressure may be applied, for example, using a squeegee or a roller. Squeegeeing pressure is typically applied working from the center of the adhesive article outward toward an edge. In this way, the squeegeeing pressure forces the fluorinated fluid to an edge of the adhesive article where it can be absorbed, for example, with an absorbent cloth or towel. In some embodiments, removing at least some of the fluorinated fluid comprises evaporating the fluorinated fluid. The amount of fluorinated fluid that is removed by evaporation depends on the boiling point of the fluorinated fluid selected and the application temperature when the adhesive surface is applied to the surface of the object. In some embodiments, evaporation is facilitated by heating the object before, during, or after the adhesive article is in place on its surface. In some embodiments, evaporation is carried out at room temperature.

Figure 2:
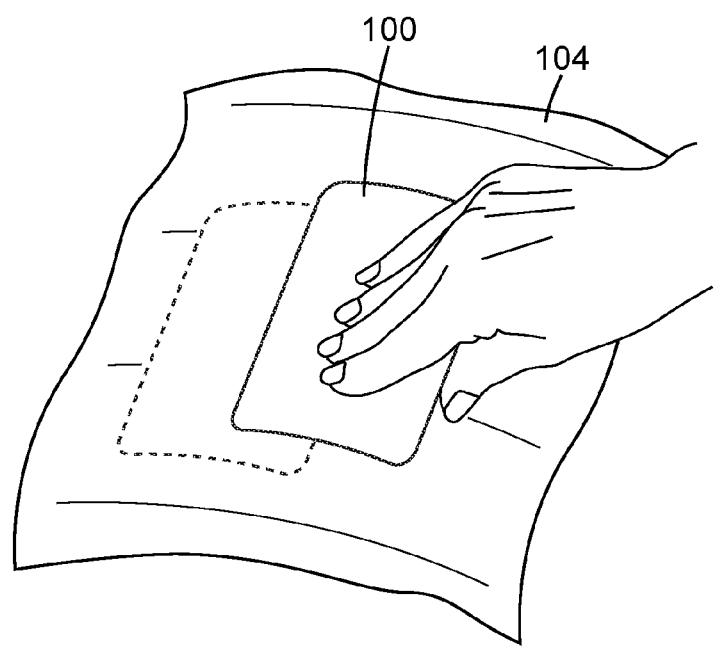
FIG. 2 shows positioning the adhesive surface to face the surface of an object such that the fluorinated fluid is between the surface of the object and the adhesive surface according to some embodiments of the method of the present disclosure.
Figure 3:
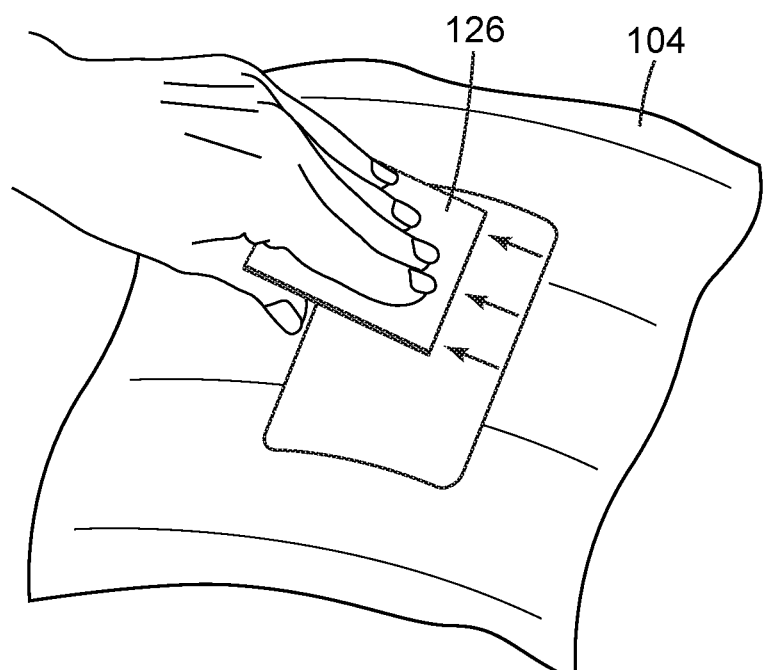
FIG. 3 shows removing at least some of the fluorinated fluid according to some embodiments of the method of the present disclosure.

A method according to some embodiments of the present disclosure is illustrated in FIGS. 1 to 3. In FIG. 1, a fluorinated fluid is applied to the adhesive surface of adhesive article 100. The fluorinated fluid can keep the adhesive article 100 from sticking too quickly to the surface of object 104, allowing sufficient time to correctly position or reposition the adhesive article 100. The fluorinated fluid can alternatively or in addition be applied to the surface of object 104. The amount of fluorinated liquid can be minimized to an amount just sufficient to allow placement and repositioning of the adhesive article. The adhesive article 100 is then placed on the object 104. The fluorinated fluid allows the adhesive article 100 to slide on the surface of the object 104.

Once the adhesive article 100 is properly in place, there can be air pockets (not shown) between the adhesive article 100 and the surface of the object 104. The air pockets and any excess liquid can be removed using a squeegee 126 as shown in FIG. 3.

In some embodiments, the ability of the adhesive article to be repositioned on the surface of the object can be useful for positioning the adhesive article on a complex surface. In some embodiments, including the embodiment illustrated in FIG. 2, the object to which the adhesive article is applied is non-planar. The object to which the adhesive article is applied can have a variety of curved or bent shapes, depending on the intended use of the article. The method of the present disclosure allows the adhesive article to be slid into position, if necessary.

The adhesive article in the method and kit according to the present disclosure may be useful for a variety of purposes. For example, the adhesive article may be a PSA coated polymer film useful for applying to objects such as windows in order to provide them with an improved property, for example, vandalism/graffiti resistance, shatter resistance, glare control and/or energy control. Multi-layered vandalism/graffiti resistant films are commercially available under the trade designation "3M WINDOW PROTECTION SHIELD(S)" from 3M Company (St. Paul, Minn.). Examples of PSA coated polymer films for shatter resistance, glare control and/or energy control are reported in U.S. Pat. No. 4,288,493 (Kropp), U.S. Pat. No. Re 29,663 (Theissen), U.S. Pat. No. 4,226,910 (Dahlen et al.), and U.S. Pat. No. 4,028,475 (Willdorf). PSA coated window films suitable for shatter resistance and/or energy control are commercially available under the trade designations "SCOTCHTINT" and "SCOTCHSHIELD" from 3M Company. For these applications, the object to which the adhesive article is applied is typically the transparent portion of a window, for example, a bus window, train window, automobile window, or architectural glazing.

In some embodiments of the method and kit according to the present disclosure, the adhesive article is provided as a stack of sheets, wherein the topmost sheet can be removed from the stack of sheets by pulling it away from the stack such that the sheet being removed from the stack as well as the sheets remaining with the stack do not delaminate. Each sheet in the stack can independently comprise a film having a first side and an opposite second side, a bonding layer (e.g., an acrylic pressure sensitive adhesive layer) bonded to the second side of the film, and an optional release layer coated on the first side of the film. Typically at least a center of the surface area of the second side of the film is in contact with the bonding layer. In some embodiments, at least about 50 percent of the surface area of the second side of the film has the bonding layer bonded thereto.

Because fluorinated fluids are generally chemically and electronically inert and can evaporate without leaving residue, they can be used in industries with stringent requirements for cleanliness and non-corrosiveness. For example, the method according to the present disclosure can be useful for making articles in the electronics and aerospace industries. The method according to the present disclosure can be useful for applying adhesive films (e.g., protective films or graphic films) to electronic devices (e.g., mobile phones, tablets, digital music players, satellite radios, in-vehicle displays, still and/or video cameras, laptops, and navigation devices). The method according to the present disclosure can also be useful for applying adhesive films (e.g., protective films, graphic films, or bonding films) to a component of an aircraft. The inertness of the fluorinated fluids also generally renders them unreactive with the adhesive in the adhesive article. This provides advantages over other solvents that may be acceptable as clean solvents but can react with components of the adhesive.

In some embodiments, the adhesive article is a bonding film or an adhesive transfer tape. Some of these are commercially available, for example, "9380 ADHESIVE TRANSFER TAPE" from 3M Company. In some embodiments, the method according to the present disclosure further includes applying a second fluorinated fluid to at least one of a surface of a second object or a second adhesive surface on the adhesive article, positioning the second adhesive surface to face the surface of the second object such that the second fluorinated fluid is between the surface of the second object and the second adhesive surface of the adhesive article, and removing at least some of the second fluorinated fluid to permit bonding between the surface of the second object and the second adhesive surface. The second fluorinated fluid may be the same as or different from the first fluorinated fluid and may be any of the fluorinated fluids described above. The second adhesive surface of the adhesive article may comprise the same or different adhesive composition as the original adhesive surface and may include any of the pressure sensitive adhesive compositions described above. The adhesive article may include two or more release liners, one to protect the original adhesive surface and one to protect the second adhesive surface. The second object may be any object that is desired to be bonded to the first object. The second object may be non-planar and may be made from any of the materials described above for the object to which the adhesive article is applied. The methods of applying the second fluorinated fluid and removing at least some of the second fluorinated fluid may be any of those described above.

A kit according to the present disclosure includes an adhesive article and a container including a fluorinated fluid. It should be understood that the kit and the container are separate components. In other words, the adhesive article is not applied to the container (e.g., as a label). The container may be a spray bottle, or the kit may further include a pump that can be adapted to the container in order to dispense the fluorinated fluid. The adhesive article may advantageously include one or more release liners positioned over the adhesive surface to protect it before use. In some embodiments, for example, for an adhesive transfer tape or bonding film, release liners are positioned over the adhesive surface and the second adhesive surface. The release liners can be any of those described above. In some embodiments, the kit further comprises a squeegee or roller to assist in removing the at least a portion of the fluorinated fluid. In some embodiments, the kit includes instructions for applying the adhesive article to another surface using the fluorinated fluid.

As shown in the Examples below, an adhesive bond between the adhesive surface and the surface of the substrate has a peel strength of at least 50% of a peel strength obtained when the adhesive surface is bonded directly to the surface of the substrate in the absence of the fluorinated fluid. In some embodiments, an adhesive bond between the adhesive surface and the surface of the substrate has a peel strength of at least 60%, 70%, 80%, and 90% of a peel strength obtained when the adhesive surface is bonded directly to the surface of the substrate in the absence of the fluorinated fluid. Given the low surface energy of the fluorinated fluid, it is surprising that the fluorinated fluid does not interrupt the adhesion between the adhesive surface and the surface of the object to a greater extent, resulting in a lower peel strength.

Fluorochemicals are often used for release surfaces and would not have been predicted to work in the method of the present disclosure. The Examples also show that the strength of the adhesive bond can increase over time as the remaining fluorinated fluid evaporates.

Some Embodiments of the Disclosure

In a first embodiment, the present disclosure provides a method of making an article, the method comprising:
applying a fluorinated fluid to at least one of a surface of an object or an adhesive surface on an adhesive article;
positioning the adhesive surface to face the surface of the object such that the fluorinated fluid is between the surface of the object and the adhesive surface; and
removing at least some of the fluorinated fluid to permit bonding between the surface of the object and the adhesive surface.

In a second embodiment, the present disclosure provides the method of the first embodiment, wherein the fluorinated fluid facilitates repositioning of the adhesive surface on the surface of the object before removing the fluorinated fluid.

In a third embodiment, the present disclosure provides the method of the first or second embodiment, wherein the fluorinated fluid is applied to the surface of the object.

In a fourth embodiment, the present disclosure provides the method of any one of the first to third embodiments, wherein the fluorinated fluid is applied to the adhesive surface.

In a fifth embodiment, the present disclosure provides the method of any one of the first to fourth embodiments, wherein the surface of the object is non-planar.

In a sixth embodiment, the present disclosure provides the method of any one of the first to fifth embodiments, wherein the surface of the object comprises at least one of metal, glass, a polymer, or a composite.

In a seventh embodiment, the present disclosure provides the method of any one of the first to sixth embodiments, wherein the article comprises at least one of a component of an electronic device or an aircraft.

In an eighth embodiment, the present disclosure provides the method of any one of the first to seventh embodiments, wherein the adhesive surface comprises a pressure sensitive adhesive.

In a ninth embodiment, the present disclosure provides the method of the eighth embodiment, wherein the pressure sensitive adhesive is a natural rubber-, acrylic-, block copolymer-, silicone-, polyisobutylene-, polyvinyl ether-, or polybutadiene-based pressure sensitive adhesive.

In a tenth embodiment, the present disclosure provides the method of any one of the first to ninth embodiments, wherein the adhesive article comprises a film comprising at least one of polyester, polycarbonate, polyolefin, or acrylic onto which an adhesive is disposed to provide the adhesive surface.

In an eleventh embodiment, the present disclosure provides the method of any one of the first to tenth embodiments, wherein the adhesive article is a bonding film, graphic film, anti-graffiti film, or an adhesive transfer tape.

In a twelfth embodiment, the present disclosure provides the method of any one of the first to eleventh embodiments, further comprising removing a release liner from the adhesive surface before positioning the adhesive surface to face the surface of the object such that the fluorinated fluid is between the surface of the object and the adhesive surface.

In a thirteenth embodiment, the present disclosure provides the method of any one of the first to twelfth embodiments, wherein removing at least some of the fluorinated fluid comprises applying pressure to force at least some of the fluorinated fluid to flow out from between the adhesive surface and the surface of the object.

In a fourteenth embodiment, the present disclosure provides the method of any one of the first to thirteenth embodiments, wherein the pressure is applied to at least a portion of the adhesive article using a squeegee or roller.

In a fifteenth embodiment, the present disclosure provides the method of any one of the first to fourteenth embodiments, wherein removing comprises evaporating the fluorinated fluid.

In a sixteenth embodiment, the present disclosure provides the method of any one of the first to fifteenth embodiments, wherein the fluorinated fluid comprises at least one of a hydrofluoroether, a hydrofluorocarbon, a hydrochlorofluorocarbon, a perfluorocarbon, a perfluoroketone, or a perfluoroolefin.

In a seventeenth embodiment, the present disclosure provides the method of the sixteenth embodiment, wherein the fluorinated fluid comprises at least one of a hydrofluoroether, a perfluoroketone, or a perfluoroolefin.

In an eighteenth embodiment, the present disclosure provides the method of any one of the first to seventeenth embodiments, wherein an adhesive bond between the adhesive surface and the surface of the substrate has a peel strength of at least 50% of a peel strength obtained when the adhesive surface is bonded directly to the surface of the substrate in the absence of the fluorinated fluid.

In a nineteenth embodiment, the present disclosure provides the method of any one of the first to eighteenth embodiments, wherein the adhesive article is a bonding film or an adhesive transfer tape, the method further comprising:
applying a second fluorinated fluid to at least one of a surface of a second object or a second adhesive surface on the adhesive article;
positioning the second adhesive surface to face the surface of the second object such that the second fluorinated fluid is between the surface of the second object and the second adhesive surface of the adhesive article; and
removing at least some of the second fluorinated fluid to permit bonding between the surface of the second object and the second adhesive surface.

In a twentieth embodiment, the present disclosure provides the method of the nineteenth embodiment, wherein the second fluorinated fluid facilitates repositioning of the second adhesive surface on the surface of the object before removing the second fluorinated fluid.

In a twenty-first embodiment, the present disclosure provides the method of the nineteenth or twentieth embodiment, wherein the second fluorinated fluid is applied to the surface of the second object.

In twenty-second embodiment, the present disclosure provides the method of any one of the nineteenth to twenty-first embodiments, wherein the second fluorinated fluid is applied to the second adhesive surface on the adhesive article.

In a twenty-third embodiment, the present disclosure provides the method of any one of the nineteenth to twenty-second embodiments, wherein the surface of second object is non-planar.

In a twenty-fourth embodiment, the present disclosure provides the method of any one of the nineteenth to twenty-third embodiments, wherein the surface of the second object comprises at least one of metal, glass, a polymer, or a composite.

In a twenty-fifth embodiment, the present disclosure provides the method of the twenty-fourth embodiment, wherein the second object comprises at least one of a component of an electronic device or an aircraft.

In a twenty-sixth embodiment, the present disclosure provides the method of any one of the nineteenth to twenty-fifth embodiments, wherein the second adhesive surface comprises a pressure sensitive adhesive.

In a twenty-seventh embodiment, the present disclosure provides the method of the twenty-sixth embodiment, wherein the pressure sensitive adhesive is a natural rubber-, acrylic-, block copolymer-, silicone-, polyisobutylene-, polyvinyl ether-, or polybutadiene-based pressure sensitive adhesive.

In a twenty-eighth embodiment, the present disclosure provides the method of any one of the nineteenth to twenty-seventh embodiment, further comprising removing a release liner from the second adhesive surface before positioning the second adhesive surface to face the surface of the second object such that the second fluorinated fluid is between the surface of the second object and the second adhesive surface.

In a twenty-ninth embodiment, the present disclosure provides the method of any one of the nineteenth to twenty-eighth embodiments, wherein removing at least some of the second fluorinated fluid comprises applying pressure to force at least some of the second fluorinated fluid to flow out from between the second adhesive surface and the surface of the second object.

In a thirtieth embodiment, the present disclosure provides the method of the twenty-ninth embodiment, wherein the pressure is applied to at least a portion of the second adhesive article using a squeegee or roller.

In a thirty-first embodiment, the present disclosure provides the method of any one of the nineteenth to thirtieth embodiments, wherein removing comprises evaporating the second fluorinated fluid.

In a thirty-second embodiment, the present disclosure provides the method of any one of the nineteenth to thirty-first embodiments, wherein the second fluorinated fluid is the same as the first fluorinated fluid.

In a thirty-third embodiment, the present disclosure provides the method of any one of the nineteenth to thirty-first embodiments, wherein the second fluorinated fluid is different from the first fluorinated fluid.

In a thirty-fourth embodiment, the present disclosure provides the method of the thirty-third embodiment, wherein the second fluorinated fluid comprises at least one of a hydrofluoroether, a hydrofluorocarbon, a hydrochlorofluorocarbon, a perfluorocarbon, a perfluoroketone, or a perfluoroolefin.

In a thirty-fifth embodiment, the present disclosure provides the method of the thirty-fourth embodiment, wherein the second fluorinated fluid comprises at least one of a hydrofluoroether, a perfluoroketone, or a perfluoroolefin.

In a thirty-sixth embodiment, the present disclosure provides a kit comprising an adhesive article and a container including a fluorinated fluid.

In a thirty-seventh embodiment, the present disclosure provides the kit of the thirty-sixth embodiment, wherein the adhesive article comprises a pressure sensitive adhesive.

In a thirty-eighth embodiment, the present disclosure provides the kit of the thirty-seventh embodiment, wherein the pressure sensitive adhesive is a natural rubber-, acrylic-, block copolymer-, silicone-, polyisobutylene-, polyvinyl ether-, or polybutadiene-based pressure sensitive adhesive.

In a thirty-ninth embodiment, the present disclosure provides the kit of any one of the thirty-sixth to thirty-eighth embodiments, wherein the adhesive article comprises a film comprising at least one of polyester, polycarbonate, polyolefin, or acrylic onto which an adhesive is disposed.

In a fortieth embodiment, the present disclosure provides the kit of any one of the thirty-sixth to thirty-ninth embodiments, wherein the adhesive article is a bonding film, graphic film, anti-graffiti film, or an adhesive transfer tape.

In a forty-first embodiment, the present disclosure provides the kit of any one of the thirty-sixth to fortieth embodiments, wherein the adhesive article further comprises a release liner covering an adhesive surface.

In a forty-second embodiment, the present disclosure provides the kit of any one of the thirty-sixth to forty-first embodiments, further comprising a squeegee or roller.

In a forty-third embodiment, the present disclosure provides the kit of any one of the thirty-sixth to forty-second embodiments, further comprising instructions for applying the adhesive article to another surface using the fluorinated fluid.

In a forty-fourth embodiment, the present disclosure provides the kit of any one of the thirty-sixth to forty-third embodiments, wherein the fluorinated fluid comprises at least one of a hydrofluoroether, a hydrofluorocarbon, a hydrochlorofluorocarbon, a perfluorocarbon, a perfluoroketone, or a perfluoroolefin.

In a forty-fifth embodiment, the present disclosure provides the kit of the forty-fourth embodiment, wherein the fluorinated fluid comprises at least one of a hydrofluoroether, a perfluoroketone, or a perfluoroolefin.

In a forty-sixth embodiment, the present disclosure provides the kit of any one of the thirty-sixth to forty-fifth embodiments, wherein the container is a spray bottle.

In order that this disclosure can be more fully understood, the following examples are set forth. It should be understood that these examples are for illustrative purposes only and are not to be construed as limiting this disclosure in any manner.

EXAMPLES

TABLE 1

Materials

| Designation | Description |
| --- | --- |
| FC-43 | A perfluorinated liquid, typical boiling point at 1 atmosphere (~101 kPa) of about 174° C., obtained from 3M Co., St. Paul, MN, under the trade designation "FLUORINERT ELECTRONIC LIQUID FC-43" |
| FC-77 | A perfluorinated liquid, typical boiling point at 1 atmosphere (~101 kPa) of about 97° C., obtained from but no longer available from 3M Co. under the trade designation "FLUORINERT ELECTRONIC LIQUID FC-77" |
| FC-3283 | A perfluorinated liquid, typical boiling point at 1 atmosphere (~101 kPa) of about 128° C., obtained from 3M Co., under the trade designation "FLUORINERT ELECTRONIC LIQUID FC-3283" |
| FC-5320 | A perfluorinated liquid, typical boiling point at 1 atmosphere (~101 kPa) of about 160° C., obtained from 3M Co., under the trade designation "FLUORINERT ELECTRONIC LIQUID FC-5320" |
| NOVEC 7500 | An engineered liquid with inertness and dielectric properties similar to perfluorocarbons and perfluoropolyethers, typical boiling point at 1 atmosphere (~101 kPa) of about 160° C., obtained from 3M Co., under the trade designation "3M NOVEC 7500 ENGINEERED FLUID" |

TABLE 1-continued

Materials

| Designation | Description |
|---|---|
| ATT-9380 | An acrylate adhesive transfer tape, obtained from 3M Co., under the trade designation "9380 ADHESIVE TRANSFER TAPE" |

90° Peel Strength

The 90° peel strength was measured according to ASTM D3330/D3330M-04(2010) Standard Test Method for Peel Adhesion of Pressure-Sensitive Tape, using Method E, with the following modifications for preparation of test samples.

Examples 1 to 5 and Comparative Examples CE-A to CE-D

Aluminum-backed tape samples were prepared using 2 mil (~51 micrometer) thick aluminum foil, alloy number 1100. Samples of 1 inch (~2.5 cm) by about 5 inches (~13 cm) of the aluminum foil were laminated with ATT-9380 adhesive transfer tape, and the release liner was peeled away to provide an aluminum-backed tape sample for testing.

A 5 inch by 5 inch (~13 cm by ~13 cm) stainless steel (SS) panel (obtained from ChemInstruments) was wiped with methyl ethyl ketone and allowed to air dry. For working examples and comparative examples other than Comparative Example A, a test liquid was sprayed twice onto the SS panel, to cover a major surface of the SS panel. An adhesive surface of the aluminum-backed tape sample was then rubbed against the liquid-covered surface of the SS panel, rubbing with a circular motion (one full circle) to reposition the tape. Excess liquid was removed by using a hand applicator squeegee (3M HAND APPLICATOR SQUEEGEE PA-1, obtained from 3M Co.) to press against the tape backing and wipe away excess liquid. The aluminum-backed tape sample was then laminated onto the liquid covered SS panel using a 4.5 pound (~2.04 kg) weight roll-down at about 20 to 30 inches (about 51 to 76 cm) per second, to produce the laminated test samples The laminated test samples were conditioned for 72 hours of dwell time at 72° F. (22° C.) before measuring peel strength. Peel strength values were recorded as the average of 3 trials, with results as summarized in Table 2, below.

TABLE 2

Peel Performance after 72 Hours of dwell time at 72° F. (22° C.)

| Sample | Test liquid | Average 90° Peel Strength, oz/inch (N/dm) | Average 90° Peel Strength Std. Dev., oz/inch (N/dm) |
|---|---|---|---|
| CE-A | None | 119 (130) | 5.0 (5.5) |
| CE-B | DI Water | 128 (140) | 5.3 (5.8) |
| CE-C | DI water + 1 drop of soap | 138 (151) | 2.8 (3.1) |
| CE-D | IPA | 107 (117) | 2.3 (2.5) |
| EX-1 | FC-43 | 87 (95) | 15.6 (17.1) |
| EX-2 | FC-77 | 106 (116) | 9.8 (11) |
| EX-3 | FC-3283 | 106 (116) | 11.3 (12.4) |
| EX-4 | FC-5320 | 91 (100) | 7.0 (7.7) |
| EX-5 | NOVEC 7500 | 112 (123) | 2.7 (3.0) |

After 120 hours, peel strengths for Examples 2 and 3 were evaluated again and found to be 116.6 and 116.7 ounces per inch width, respectively. After 120 hours, the peel strength of Comparative Example A increased to 135.5 ounces per inch width. After one week, peel strengths for Examples 2 and 3 were evaluated again and found to be 120.2 and 121.5 ounces per inch width, respectively. After 120 hours, the peel strength of Comparative Example A increased to 140.7 ounces per inch width.

Examples 6 to 10 and Comparative Examples CE-E to CE-I

Examples 6 to 10 and Comparative Examples CE-E to CE-I were carried out using the method described above for Examples 1 to 5. For Examples 6 to 10, the fluorinated fluid was "NOVEC 7500" engineered fluid. Additional studies at a variety of temperature and humidity conditions were carried out. Laminated test samples were prepared as described above, using NOVEC 7500 as the test liquid. Laminated samples were kept for 30 days dwell time at the temperature and humidity conditions indicated in Table 3 before measuring peel strength. Peel strength values were recorded as the average of 3 trials, unless indicated otherwise, with results as summarized in Table 3.

TABLE 3

30 days of dwell time at the indicated conditions

| Sample | Conditions* | Test liquid | Average 90° Peel Strength, oz/inch (N/dm) | Average 90° Peel Strength Std. Dev., oz/inch (N/dm) |
|---|---|---|---|---|
| CE-E | 72° F./50% RH | None | 165 (181) | 8.8 (9.7) |
| EX-6 | 72° F./50% RH | NOVEC 7500 | 148 (162) | 7.2 (7.9) |
| CE-F | 90° F./90% RH | None | 121 (132) | 5.1 (5.6) |
| EX-7 | 90° F./90% RH | NOVEC 7500 | 122 (133) | 1.3 (1.4) |
| CE-G | 150° F./80% RH | None | 140 (154) | 2.9 (3.2) |
| EX-8 | 150° F./80% RH | NOVEC 7500 | 139 (152) | 3.7 (4) |
| CE-H | 158° F. | None | 199 (218) | 17.3 (19), n = 2 |
| EX-9 | 158° F. | NOVEC 7500 | 231 (253) | 27 (29.6) |
| CE-I | 250° F. | None | 225 (246) | 22.4 (24.5) |
| EX-10 | 250° F. | NOVEC 7500 | 222 (243) | 6.1 (6.7) |

*72° F. = 22° C.; 90° F. = 32° C.; 150° F. = 66° C.; 158° = 70° C.; 250° F. = 121° C.; humidity was not controlled for samples kept at 158° F. and 250° F.

This disclosure is not limited to the above-described embodiments but is to be controlled by the limitations set forth in the following claims and any equivalents thereof. This disclosure may be suitably practiced in the absence of any element not specifically disclosed herein.

What is claimed is:

1. A method of making an article, the method comprising: applying a fluorinated fluid to at least one of a surface of an object or an adhesive surface on an adhesive article; positioning the adhesive surface to face the surface of the object such that the fluorinated fluid is between the surface of the object and the adhesive surface; and removing at least some of the fluorinated fluid to permit bonding between the surface of the object and the adhesive surface to make the article.

2. The method of claim 1, wherein the fluorinated fluid facilitates repositioning of the adhesive surface on the surface of the object before removing the fluorinated fluid.

3. The method of claim 1, wherein the surface of the object is non-planar.

4. The method of claim 1, wherein the surface of the object comprises at least one of metal, glass, a polymer, or a composite.

5. The method of claim 1, wherein the article comprises at least one of a component of an electronic device or an aircraft.

6. The method of claim 1, wherein the adhesive surface comprises a pressure sensitive adhesive.

7. The method of claim 6, wherein the pressure sensitive adhesive is a natural rubber-, acrylic-, block copolymer-, silicone-, polyisobutylene-, polyvinyl ether-, or polybutadiene-based pressure sensitive adhesive.

8. The method of claim 1, wherein the adhesive article comprises a film comprising at least one of polyester, polycarbonate, polyolefin, or acrylic onto which an adhesive is disposed to provide the adhesive surface.

9. The method of claim 1, wherein the adhesive article is a bonding film, graphic film, anti-graffiti film, or an adhesive transfer tape.

10. The method of claim 1, further comprising removing a release liner from the adhesive surface before positioning the adhesive surface to face the surface of the object such that the fluorinated fluid is between the surface of the object and the adhesive surface.

11. The method of claim 1, wherein removing at least some of the fluorinated fluid comprises applying pressure to force at least some of the fluorinated fluid to flow out from between the adhesive surface and the surface of the object.

12. The method of claim 11, wherein the pressure is applied to at least a portion of the adhesive article using a squeegee or roller.

13. The method of claim 1, wherein removing at least some of the fluorinated fluid comprises evaporating the fluorinated fluid.

14. The method of claim 1, wherein the fluorinated fluid comprises at least one of a hydrofluoroether, a hydrofluorocarbon, a hydrochlorofluorocarbon, a perfluorocarbon, a perfluoroketone, or a perfluoroolefin.

15. The method of claim 14, wherein the fluorinated fluid comprises at least one of the hydrofluoroether, the perfluoroketone, or the perfluoroolefin.

16. The method of claim 1, wherein the adhesive article is a bonding film or an adhesive transfer tape, the method further comprising:
applying a second fluorinated fluid to at least one of a surface of a second object or a second adhesive surface on the adhesive article;
positioning the second adhesive surface to face the surface of the second object such that the second fluorinated fluid is between the surface of the second object and the second adhesive surface of the adhesive article; and
removing at least some of the second fluorinated fluid to permit bonding between the surface of the second object and the second adhesive surface.

17. The method of claim 16, wherein the second fluorinated fluid facilitates repositioning of the second adhesive surface on the surface of the object before removing the second fluorinated fluid.

* * * * *

UNITED STATES PATENT AND TRADEMARK OFFICE
CERTIFICATE OF CORRECTION

PATENT NO. : 9,803,110 B2  
APPLICATION NO. : 15/366777  
DATED : October 31, 2017  
INVENTOR(S) : Nicholas Lee et al.

Page 1 of 1

It is certified that error appears in the above-identified patent and that said Letters Patent is hereby corrected as shown below:

In the Specification

<u>Column 3</u>  
Line 63, delete "$Rf^3[O—R_h]_f,$" and insert -- $Rf^3—[O—R_h]_f,$ --, therefor.

<u>Column 4</u>  
Line 22-23, delete "$Rf^3[O—R_h]_f,$" and insert -- $Rf^3—[O—R_h]_f,$ --, therefor.

Signed and Sealed this  
Eighth Day of September, 2020

Andrei Iancu  
*Director of the United States Patent and Trademark Office*